INVENTOR.
Neal Seegert
BY Seegert & Schwallach
Att'ys

United States Patent Office 2,963,531
Patented Dec. 6, 1960

2,963,531

TEMPERATURE CONTROLLED THERMOCOUPLE JUNCTION

Neal Seegert, Elm Grove, Wis., assignor, by mesne assignments, to Minnesota Mining and Manufacturing Company, St. Paul, Minn., a corporation of Delaware Filed Dec. 6, 1956, Ser. No. 626,700

6 Claims. (Cl. 136—4)

This invention relates to temperature responsive devices and more particularly to those devices which employ thermoelectric generators, as for the purpose of measuring temperatures or controlling apparatus in response to fluctuations in temperature.

An object of this invention is to provide a temperature responsive device employing a thermoelectric generator, wherein a high degree of accuracy is obtained.

Another object is to provide a temperature responsive device employing a thermoelectric generator, wherein changes in ambient temperature have negligible effect on the accuracy of the device.

Another object is to provide a temperature responsive device employing a thermocouple and having means for maintaining one of the thermocouple junctions at a predetermined constant temperature.

Another object is to provide a temperature responsive device employing a thermocouple and having means for maintaining one of the thermocouple junctions at a constant temperature which is substantially less than ambient temperature.

Another object is to provide a temperature responsive device as characterized above, wherein means including an electroresponsive heat pump is employed to maintain a thermocouple reference junction at a constant temperature substantially lower than ambient temperature.

Another object is to provide a temperature responsive device as characterized above wherein a heat pump is employed for alternatively heating and cooling a thermocouple reference junction so as to maintain the temperature thereof substantially constant.

Another object is to provide a temperature responsive device as characterized above having means including a reversibly energizable heat pump for alternatively heating and cooling of a thermocouple reference junction, there being a temperature responsive reversing switch in circuit with said heat pump and responsive to the temperature of said reference junction to maintain the temperature of the latter substantially constant.

Figure 1:
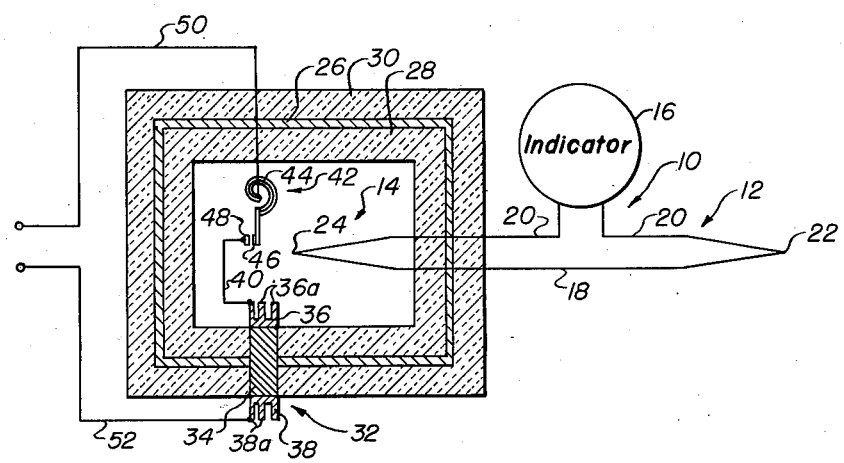
Figure 2:
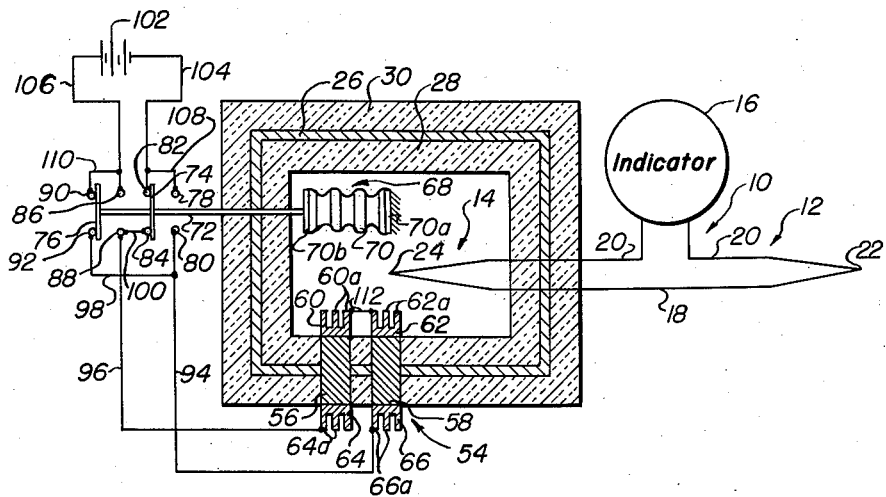

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Figure 1 is a more or less schematic showing of a first embodiment of the present invention, some of the components being shown in section, and Figure 2 is a more or less schematic showing of a second embodiment of this invention, some of the components being shown in section.

Like reference characters indicate corresponding parts throughout the several views of the drawings.

Referring to Figure 1 of the drawings, it shows a thermoelectric circuit 10 comprising thermocouple junction means 12, thermocouple junction means 14, and an indicator 16. Junction means 12 and 14 comprise thermocouple elements 18 and 20 formed of thermoelectrically dissimilar materials and joined at opposite ends to provide junctions 22 and 24. Indicator 16 is interposed in thermocouple element 20 in series circuit arrangement with junctions 22 and 24.

In order to increase the sensitivity of indicator 16 or any other electroresponsive control device which might be substituted therefor, means is provided for maintaining junction 24 at a predetermined constant temperature which is less than the ambient temperature. In this manner, a great temperature difference will be provided between reference junction 24 and temperature sensing junction 22, resulting in greater current flow in thermoelectric circuit 10. Such means comprises an enclosure 26 surrounding reference junction 24, as shown in Figures 1 and 2, and having heat insulating means 28 lining the interior surface thereof and heat insulating means 30 covering the external surface thereof to substantially isolate the cold junction 24 from variations in ambient temperature.

Positioned within a side wall of enclosure 26 and insulating means 28, is a heat pump 32 comprising thermoelement means 34. Fixed to thermoelement means 34 within enclosure 26 is a heat absorbing member 36 formed with fins 36a for efficiently absorbing heat from the air within enclosure 26, while a heat dissipating member 38 formed with fins 38a is fixed to thermoelement means 34 on the exterior side of enclosure 26 for efficiently dissipating heat to the atmosphere surrounding enclosure 26.

Connected to member 36 within enclosure 26, is a lead wire 40. A condition responsive circuit controlling device or thermostatic switch 42 is provided within enclosure 26 in close proximity to reference junction 24 and comprises a bimetal element 44 which carries a movable contact 46 for cooperation, as is well understood in the art, with a stationary contact 48 fixed to one end of lead wire 40. Bimetal element 44 is formed of two metallic members having different coefficients of expansion and is connected to a lead wire 50 which extends through a wall of enclosure 26. A lead wire 52 is connected to member 38 and cooperates with lead wire 50 to afford means for connecting heat pump 32 to a source of direct current electrical energy (not shown).

In order to maintain reference junction 24 at a substantially constant low temperature, it is first necessary to connect lead wires 50 and 52 to a source of direct current electrical energy. Then, with thermostatic switch 42 adjusted to effect disengagement of contacts 46 and 48 upon occurrence of such temperature within enclosure 26, current flows from the source through the circuit comprising lead wire 50, bimetal element 54, contacts 46 and 48, lead wire 40, member 36, element 34, member 38 and lead wire 52. Current flow through element 34 causes heat to be pumped along thermoelement 34 from member 36 to member 38, the fins 36a absorbing heat from within enclosure 26 and the fins 38a dissipating such heat to the atmosphere surrounding enclosure 26.

In order for thermoelement 34 to pump heat so as to lower the temperature within enclosure 26, it is necessary that element 34 be of any suitable material which exhibits a high Peltier coefficient, low thermal conductivity, and low electrical resistivity. More specifically, element 34 may be of the materials described disclosed in the copending application of Robert W. Fritts and Sebastian Karrer, Serial Number 512,436, filed June 6, 1956. Such materials are semi-metallic alloys or compositions which may be characterized as binary metallic compounds of slightly imperfect compositions, i.e., containing beneficial impurities constituting departures from perfect stoichiometry by reason of an excess of one of the metals over the other and/or containing added beneficial impurity substances denominated hereinafter "promoters." Such semi-metallic compositions have semi-conductorlike conductivity (both electrical and thermal, as aforementioned). Semi-metallic alloys or compositions also include mixtures of such binary metallic compounds, which may be denominated ternary metallic alloys or compositions. Certain of these alloys or compositions exhibit negative and certain exhibit positive electrical characteristics.

The type (positive or negative) of alloy or composition selected for thermoelement means 34 is dependent upon the direction of current flow through the element 34. That is, current flow through a thermoelement which exhibits positive electrical characteristics causes heat to be pumped in the direction of current flow therethrough. Conversely, current flow through a thermoelement which exhibits negative electrical characteristics causes heat to be pumped in the direction opposite to the direction of current flow therethrough. Thus, if current flows through element 34 from member 36 to member 38, element 34 must exhibit positive electrical characteristics whereas, if current flows therethrough in the opposite direction, element 34 must exhibit negative electrical characteristics. Under either condition, heat is pumped through element 34 from member 36 to member 38 thereby decreasing the temperature within enclosure 26.

A negative thermoelement means may, for example, be formed of an alloy comprising lead and at least one member of the group tellurium, selenium and sulphur. For example, a negative thermoelement of lead-selenium-tellurium composition could include a tellurium-selenium constituent in which the selenium is but a trace. In this case, such constituent should constitute from 35% to 38.05% by weight of the composition, a balance (61.95% to 65% by weight) being lead. At the other extreme where the tellurium-selenium constituent consists almost entirely of selenium with but a trace of tellurium, such constituent should comprise from 25% to 27.55% by weight of the final composition, the remainder (from 72.45% to 75% by weight) being lead. Between these two extremes, the selenium-tellurium constituent varies linearly with the ratio of selenium to tellurium (expressed in atomic percent) in the selenium-tellurium constituent.

A negative thermoelement may also be formed of an alloy of lead, selenium and sulphur. For example, a thermoelement of lead-selenium-sulphur composition could consist of a selenium-sulphur constituent in which the sulphur is but a trace. In this case, such constituent should constitute from 25% to 27.55% by weight of the composition, the balance (75% to 72.45% by weight) being lead. At the other extreme, where the selenium-sulphur constituent consists almost entirely of sulphur with but a trace of selenium, such constituent should comprise from 12.8% to 13.37% by weight of the final composition, the remainder (from 87.2% to 86.63% by weight) being lead. Between these two extremes, the selenium-sulphur constituent varies linearly with the ratio of selenium to sulphur (expressed in atomic percent) in the selenium-sulphur constituent.

With regard to the aforementioned compositions, it will be observed that in each case there is an excess of lead over and above the amount thereof necessary for satisfying the stoichiometric proportions of the compound formed in the second constituent or constituents, i.e., the tellurium, selenium or sulphur. For example, a composition consisting substantially of lead and selenium can contain up to 10.4% lead by weight of the total composition over and above the 72.41% by weight lead stoichiometrically necessary for combination with selenium.

The electrical characteristics of the aforementioned semi-metallic alloys, desirable, for example, in thermoelements for heat pump application can be markedly and advantageously altered in a reproducible manner by the addition thereto of controlled amounts of matter other than the constituents of the base composition. Such compositions may also be denominated "beneficial impurities" as distinguished from undesirable impurities. For convenience, these additions are hereinafter designated "promoters," since they tend to enhance the electrical characteristics desired for the particular application of the base compositions.

As has previously been observed, all of the aforedescribed base compositions exhibit negative Peltier E.M.F. and negative conductivity. By the addition of certain "promoters," such negative properties may be enhanced, while the polarity of the electrical properties of the base compositions may be reversed by the addition of certain other "promoters" to provide a semi-metallic composition having positive electrical characteristics, i.e., positive conductivity and Peltier E.M.F.

The aforementioned copending application of Robert W. Fritts and Sebastian Karrer gives a complete description of the beneficial impurities, including both departures from perfect stoichiometry and promoters, which have been found to be effective for improvement of the electrical properties of semi-metallic thermoelectric elements for heat pump application when added to the aforementioned base compositions in minor amounts. For example, up to a maximum of 6.9% by weight of beneficial impurity including 3.9% excess lead and 3.0% promoter for promoted compounds and a maximum of 10.4% by weight of beneficial impurity for unpromoted compositions.

The proportions and ranges of the various constituents aforementioned and particularly the minimum limits of lead constituent in the compositions, must be regarded as critical if the composition is to have the electrical properties desired in thermoelectric heat pump elements. If the lead content is significantly less than the minimum amount indicated for any particular selenium-tellurium or selenium-sulphur proportion, the desired values of Peltier E.M.F. and resistivity will not be afforded and the significant electrical and mechanical properties will not be reproducible. On the other hand, if the lead content for any composition appreciably exceeds the aforementioned maximum limit, the resulting composition is too metallic in nature to afford satisfactory electrical characteristics for the purposes of the present invention.

A positive thermoelement may also be formed of an alloy of lead and tellurium in which there is an excess of tellurium over and above the amount thereof necessary for satisfying the stoichiometric proportions of the compound lead-telluride. Such alloy or composition should consist essentially of lead and tellurium in which lead is present in the range of 58.0% to 61.8% by weight and the balance in range of 42.0% to 38.2% by weight tellurium. It will be observed that in this case there is an excess of tellurium over and above the amount thereof necessary for satisfying the stoichiometric proportions.

As has been previously observed, the tellurium rich base lead-tellurium compositions exhibit positive Peltier E.M.F. and positive conductivity. The electrical characteristics of this compound, desirable, for example, in thermoelements for heat pump applications, can be markedly and advantageously altered in a reproducible manner by addition thereto of controlled amounts of matter other than the constituents of such base composition. Such matter may also be denominated "beneficial impurities" as distinguished from undesirable impurities. For convenience, the additions are hereinafter designated "promoters" since they tend to enhance the electrical characteristics desired for the particular application of the base compositions.

The aforementioned copending application of Robert W. Fritts and Sebastian Karrer gives a complete description of the beneficial impurities, including both departures from perfect stoichiometry and promoters, which have been found to be effective for improvement of electrical properties of semi-metallic thermoelectric elements for heat pump applications when added to the aforementioned tellurium rich base lead-tellurium compositions. For example, up to a maximum of 5.5% by weight of beneficial impurity including 4.9% excess tellurium and 0.60% promoter for promoted compounds and a maximum of 6.7% by weight of beneficial impurity for unpromoted compositions.

The proportions and ranges of the various constituents aforementioned and particularly the minimum limits of tellurium in the compositions, must be regarded as critical if the composition is to have the electrical properties desired in thermoelectric heat pump elements. If the tellurium content is significantly less than the minimum amount indicated, the desired values of Peltier E.M.F. and resistivity will not be afforded and the significant electrical and mechanical properties will not be reproducible. On the other hand, if the tellurium content appreciably exceeds the aforementioned maximum limits, the resulting composition will not afford satisfactory electrical characteristics for the purposes of the present invention.

Not only are the proportions and ranges aforedescribed to be considered critical, but so also is the purity. More specifically, the limit of tolerable metallic impurity in the final composition has been found to be of the order of 0.01%, and the composition must be substantially oxygen free, if the mechanical and electrical properties desired are to be obtained and are to be reproducible. In the case of promoter compositions, however, the limit of tolerable impurity is 0.001%.

Heat pump 32 continues to remove heat from enclosure 26 until the aforementioned predetermined temperature is reached, whereupon bimetal element 44 of switch 42 moves contact 46 out of engagement with stationary contact 48. Such disengagement of contacts 46 and 48 terminates energization of heat pump 32 and prevents further cooling of reference junction 24. Switch 42 continues to respond as above explained to control the energization of pump 32 and maintain the thermocouple reference junction 24 at the aforementioned predetermined temperature.

With the temperature of reference junction 24 thus maintained substantially constant, any variation in the temperature of junction 22 causes a corresponding change in the current flow in thermoelectric circuit 10.

The apparatus shown in Figure 2 comprises many of the same components shown in the apparatus of Figure 1. Such identical components are identified with the same reference numerals and hence will not be described here in detail since reference may be had to the description of Figure 1 for a complete understanding of such components.

Positioned within a side wall of enclosure 26 and insulating means 28 and 30, is a heat pump 54 comprising two thermoelectric means 56 and 58. Fixed respectively to thermoelement means 56 and 58 within enclosure 26 are heat transfer members 60 and 62 formed with fins 60a and 62a respectively. Also fixed to thermoelement means 56 and 58, but to the exterior side of enclosure 26, are heat transfer members 64 and 66 formed with fins 64a and 66a respectively.

Positioned within enclosure 26 in close proximity to reference junction 24, is a temperature responsive circuit controlling device 68 comprising an expansible and contractible enclosure 70 having a stationary end wall 70a and a movable end wall 70b. Enclosure 70 is provided with a volatile fluid fill for expansion and contraction of enclosure 70 with changes in temperature. Circuit controlling device 70 further comprises a switch operating stem 72 fixed to movable end wall 70b of enclosure 70 and extending through openings in enclosure 26 and insulating means 28 and 30. Movable contact members 74 and 76 are fixed to stem 72 for movement therewith in response to expansion and contraction of the fluid fill of enclosure 70. Several pairs of stationary contacts are provided for cooperation with movable contact members 74 and 76. Stationary contacts 78 and 80 comprise one pair of contacts for engagement by movable contact member 74, while stationary contacts 82 and 84 constitute the other pair of contacts therefor. Stationary contacts 86 and 88 and stationary contacts 90 and 92 provide the several pairs of contacts for alternative engagement by movable contact member 76. A lead wire 94 is provided for electrical connection of stationary contact 80 with heat transfer member 66 and a lead wire 96 is provided to afford electrical connection of stationary contact 88 with heat transfer member 64. Affording connection between stationary contact 92 and lead wire 94 is a lead wire 98, and affording connection between stationary contacts 84 and 88 is a lead wire 100.

A source of direct current electrical energy, such as battery 102, is provided for energization of heat pump 54. A lead wire 104 affords connection of the negative pole of battery 102 with contact 82, while a lead wire 106 affords electrical connection of the positive pole of the battery 102 with contact 86. A lead wire 108 interconnects contact 78 and lead wire 104, while a lead wire 110 interconnects contact 90 and lead wire 106. Members 60 and 62 are interconnected within enclosure 26 by means of a lead wire 112.

When two thermoelements are employed for pumping heat in a given direction, as for example, heat pump 54 of Figure 2, it is desirable to have the thermoelements exhibit opposite electrical characteristics. If the two elements are connected in series circuit arrangement; that is, with the elements connected in a series, electrical current will flow into enclosure 26 through one of the elements 64 and 66, and out of enclosure 26 through the other element. Thus, to effect cooling of reference junction 24 within enclosure 26, it is necessary that the thermoelement which conducts current into the enclosure 26, exhibit negative electrical characteristics so as to pump heat from the direction opposite the current flow therethrough, while the element which conducts current out of the enclosure must exhibit positive electrical characteristics so as to pump heat in the same direction as current flow therethrough. Thus, the thermoelement 56 of heat pump 54 of Figure 2 should exhibit positive electrical characteristics and thermoelement 58 thereof should exhibit negative electrical characteristics in view of the position of battery 102 in the energizing circuit for pump 54, as will hereinafter become apparent.

Thus, with movable contact members 74 and 76 in engagement respectively with the sets of contacts comprising stationary contacts 82 and 84 and stationary contacts 90 and 92, respectively, current flows from the positive pole of battery 102 through lead wires 106 and 110, contact 76, lead wires 98 and 94, member 66, thermoelement 58, member 62, lead wire 112, member 60, thermoelement 56, member 64, lead wires 96 and 100, contact 74, and lead wire 104 to the negative pole of battery 102. Such current flow through negative thermoelement 58 causes heat to be absorbed by fins 62a of member 62 and pumped through element 58 to member 66, where it is dissipated to the ambient atmosphere by fins 66a. Current flow through positive thermoelement 56 causes heat to be absorbed by the fins 60a of member 60 and pumped through element 56 to member 64 where it is dissipated to the ambient atmosphere by fins 64a. Such operation of heat pump 54 effectively cools the reference junction 24.

Cooling of the fluid fill of enclosure 70 causes the same to contract, thereby moving end wall 70b and stem 72 to the right, as viewed in Figure 2. Such movement of stem 72 causes movable contact members 74 and 76 to be disengaged from their respective sets of contacts comprising stationary contacts 82 and 84 and contacts 90 and 92 thereby interrupting the aforementioned current flow through thermoelements 56 and 58 and cooling of the thermocouple reference junction 24. In this manner, reference junction 24 is maintained at a temperature which is substantially less than ambient temperature.

If the occasion should arise where the ambient temperature drops to a value which effects cooling of reference junction 24 below the low temperature to be maintained within enclosure 26, the fluid fill of enclosure 70 responds accordingly to effect engagement of movable contact member 74 and stationary contacts 78 and 80 and engagement of movable contact member 76 and stationary contacts 86 and 88. Such positioning of movable contact members 74 and 76, permits current to flow from the positive pole of battery 102 through lead wire 106, contact member 76, lead wire 96, member 64, thermoelement 56, member 60, lead wire 112, member 62, thermoelement 58, member 66, lead wire 94, contact member 74, and lead wires 108 and 104 to the negative pole of battery 102. Thus, current flows into enclosure 26 through positive thermoelement 56 and out of enclosure 26 through negative thermoelement 58. Under these conditions elements 56 and 58 cause heat to be absorbed from the surrounding atmosphere by members 64 and 66 and pumped to the members 60 and 62 for dissipation to the atmosphere within enclosure 26. This continues, of course, until the fill of enclosure 70 expands sufficiently to move movable contact members 74 and 76 out of engagement with their respective sets of contacts comprising stationary contacts 78 and 80 and contacts 86 and 88.

Separate adjustable biasing means may be employed for the movable end wall 70b of enclosure 70 to urge end wall 70b to the right as viewed in Figure 2, without departing from the spirit of this invention. With the temperature of thermocouple reference junction 24 maintained substantially constant, current flow in thermoelectric circuit 10 is substantially solely dependent upon the temperature of thermocouple junction 22 as above explained with reference to Figure 1.

The indicator 16 may be calibrated in any manner desired to provide indication of variation in temperature at junction 22. In the alternative, any suitable current sensitive control device, such as an electroresponsive valve or switch may be substituted for indicator 16 to provide certain control functions in response to changes in the temperature of junction 22. Such current sensitive control devices are to be considered the equivalent of indicator 16 within the scope of the appended claims.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A temperature responsive device, comprising, a thermoelectric generator having a reference junction and a temperature sensing junction, an electroresponsive device connected in circuit with said generator for energization by the electrical output of said generator, and means for increasing the output of said generator for a given temperature sensed, comprising a thermally insulating enclosure for said reference junction, thermoelectric heat pump means having heat absorbing thermojunction means within said enclosure in heat transfer relation with said reference junction and having heat emitting thermojunction means externally of said enclosure, and means for energizing said heat pump means independently of the energization afforded to said electroresponsive device by said generator to pump heat from said heat absorbing thermojunction means toward said heat emitting thermojunction means to thereby maintain the temperature at said reference junction at less than the ambient temperature external to said enclosure.

2. A temperature responsive device, comprising, a thermoelectric generator having a reference junction and a temperature sensing junction, an electroresponsive device connected in circuit with said generator for energization by the electrical output of said generator, means affording said generator ambient reference junction compensation comprising a thermally insulating enclosure for said reference junction, electroresponsive heat pump means having thermojunction means within said enclosure in heat transfer relation with said reference junction and having thermojunction means externally of said enclosure, said heat pump means being energizable to pump heat from one of said thermojunction means toward the other in accordance with the polarity of the current energizing said heat pump means, and temperature responsive reversing switch means in circuit with said heat pump means and with a source of direct current for controlling the energization of said heat pump means, said temperature responsive means having means within said enclosure sensing the temperature at said reference junction to thereby maintain said reference junction at a predetermined substantially uniform temperature irrespective of ambient temperature changes.

3. A temperature responsive device, comprising, a thermoelectric generator having a reference junction and a temperature sensing junction, means affording said generator ambient reference junction compensation comprising a thermally insulating enclosure for said reference junction, electroresponsive heat pump means having thermojunction means within said enclosure in heat transfer relation with said reference junction and having thermojunction means externally of said enclosure, said heat pump means being operable when energized by direct current of one polarity to pump heat from one of said thermojunction means toward the other, and when energized by direct current of the opposite polarity to pump heat in the opposite direction from said other toward said one thermojunction means, and temperature responsive control means in circuit with said heat pump means and with a source of direct current, said control means having means within said enclosure sensing the temperature at said reference junction and being operable in response to a temperature at said reference junction below a predetermined level to energize said heat pump means with direct current of one polarity to heat said reference junction, and in response to temperature at said reference junction above said predetermined level to energize said heat pump means with direct current of the opposite polarity to cool said reference junction, thereby maintaining said reference junction substantially at said predetermined temperature irrespective of ambient temperature changes.

4. A temperature responsive device, comprising, a thermoelectric generator having a reference junction and a temperature sensing junction, means for increasing the output of said generator for a given temperature sensed and for affording said generator ambient reference junction compensation comprising a thermally insulating enclosure for said reference junction, electroresponsive heat pump means comprising a P type and an N type thermoelement joined by thermojunction means within said enclosure in heat transfer relation with said reference junction and having thermojunction means externally of said enclosure, said heat pump means being operable when energized by direct current of one polarity to pump heat inwardly through both of said thermoelements from said external thermojunction means toward said internal thermojunction means, and when energized by direct current of the opposite polarity to pump heat through both of said thermoelements in the opposite direction from said internal thermojunction means toward said external thermojunction means, and temperature responsive control means in circuit with said heat pump means and with a source of direct current, said control means having means within said enclosure sensing the temperature at said reference junction, said control means preventing energization of said heat pump means when the temperature at said reference junction is at a predetermined sub-ambient level and being operable in response to a temperature at said reference junction below said predetermined level to energize said heat pump means with direct current of said one polarity to heat said reference junction, and in response to temperature at said reference junction above said predetermined level to energize said heat pump means with current of said opposite polarity to cool said reference junction, thereby maintaining said reference junction substantially at said predetermined sub-ambient temperature irrespective of ambient temperature changes.

5. A temperature responsive device, comprising, a thermoelectric generator having a reference junction and a temperature sensing junction, an electroresponsive device connected in circuit with said generator for energization by the electrical output of said generator, and means affording said generator ambient reference junction compensation including a thermoelectric heat pump and temperature responsive switch means responsive to the temperature at said reference junction and connected in circuit with said heat pump and with a source of direct current for said heat pump maintaining said reference junction at a predetermined substantially uniform temperature irrespective of ambient temperature changes and independent of the energization afforded to said electroresponsive device by said generator.

6. A temperature responsive device, comprising, a thermoelectric generator having a reference junction and a temperature sensing junction, an electroresponsive device connected in circuit with said generator for energization by the electrical output of said generator, and means for increasing the output of said generator for a given temperature sensed and for affording said generator ambient reference junction compensation, comprising cooling means for said reference junction including a thermoelectric heat pump and temperature responsive switch means responsive to the temperature at said reference junction and connected in circuit with said heat pump and with a source of direct current for said heat pump maintaining said reference junction at a predetermined substantially uniform temperature which is less than ambient temperature independent of the energization afforded to said electroresponsive device by said generator.

References Cited in the file of this patent

UNITED STATES PATENTS

| | | |
|---|---|---|
| 2,697,735 | Knudsen | Dec. 21, 1954 |
| 2,749,716 | Lindenblad | June 12, 1956 |
| 2,758,146 | Lindenblad | Aug. 7, 1956 |
| 2,766,937 | Snovely | Oct. 16, 1956 |

OTHER REFERENCES

"Temperature, Its Measurement and Control in Science and Industry," American Institute of Physics, Reinhold Publishing Corp., New York, pp. 291–292.

Telkes, M.: "The Efficiency of Thermoelectric Generators." Journal of Applied Physics, vol. 18, No. 6, December 1947, pp. 1116–1127.

Kaltetechnik, vol. 5, No. 6, June 1953, pp. 150–157.